United States Patent
Kim et al.

(10) Patent No.: US 10,810,856 B2
(45) Date of Patent: Oct. 20, 2020

(54) DANGEROUS SITUATION DETECTION METHOD AND APPARATUS USING TIME SERIES ANALYSIS OF USER BEHAVIORS

(71) Applicant: Electronics and Telecommunications Research Institute, Daejeon (KR)

(72) Inventors: Hyojin Kim, Seoul (KR); Hyunho Park, Daejeon (KR); Eunjung Kwon, Daejeon (KR); Sungwon Byon, Gwangju-si (KR); Yong-Tae Lee, Daejeon (KR); Eui-Suk Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/387,327

(22) Filed: Apr. 17, 2019

(65) Prior Publication Data

US 2019/0325728 A1 Oct. 24, 2019

(30) Foreign Application Priority Data

Apr. 18, 2018 (KR) ........................ 10-2018-0044845

(51) Int. Cl.
*G08B 21/04* (2006.01)
*G06F 3/01* (2006.01)
*G08B 21/18* (2006.01)

(52) U.S. Cl.
CPC ............ *G08B 21/043* (2013.01); *G06F 3/011* (2013.01); *G06F 3/017* (2013.01); *G08B 21/0461* (2013.01); *G08B 21/182* (2013.01)

(58) Field of Classification Search
CPC ............ G08B 21/043; G08B 21/0461; G08B 21/182; G06F 3/011; G06F 3/017
USPC ...................................................... 340/573.1
See application file for complete search history.

(56) References Cited

U.S. PATENT DOCUMENTS

| | | | | |
|---|---|---|---|---|
| 2003/0169171 | A1* | 9/2003 | Strubbe | G08B 21/0423 340/573.1 |
| 2008/0001735 | A1* | 1/2008 | Tran | G08B 21/02 340/539.22 |
| 2011/0137831 | A1* | 6/2011 | Ide | G06K 9/6297 706/12 |
| 2014/0298117 | A1* | 10/2014 | Ahmadi-Ardakani | G06F 11/0757 714/55 |

FOREIGN PATENT DOCUMENTS

| KR | 100993494 B1 | 11/2010 |
|---|---|---|
| KR | 1020130124184 A | 11/2013 |

(Continued)

*Primary Examiner* — Kerri L McNally
(74) *Attorney, Agent, or Firm* — William Park & Associates Ltd.

(57) ABSTRACT

The present invention relates to dangerous situation detection method and apparatus using a time series analysis of user behaviors. The dangerous situation detection method and apparatus using a time series analysis of user behaviors according to the present invention includes recognizing user behaviors in a time series manner using sensor sensing data, setting stability interval periods and reflecting stability factors on the user behaviors recognized in the time series manner for each of the stability interval periods to set a stability level, and determining a danger level on the basis of the recognized user behaviors and the set stability level.

17 Claims, 6 Drawing Sheets

(56) References Cited

FOREIGN PATENT DOCUMENTS

KR          101367964 B1    3/2014
KR    1020140125261 A   10/2014

\* cited by examiner

[FIG.1]
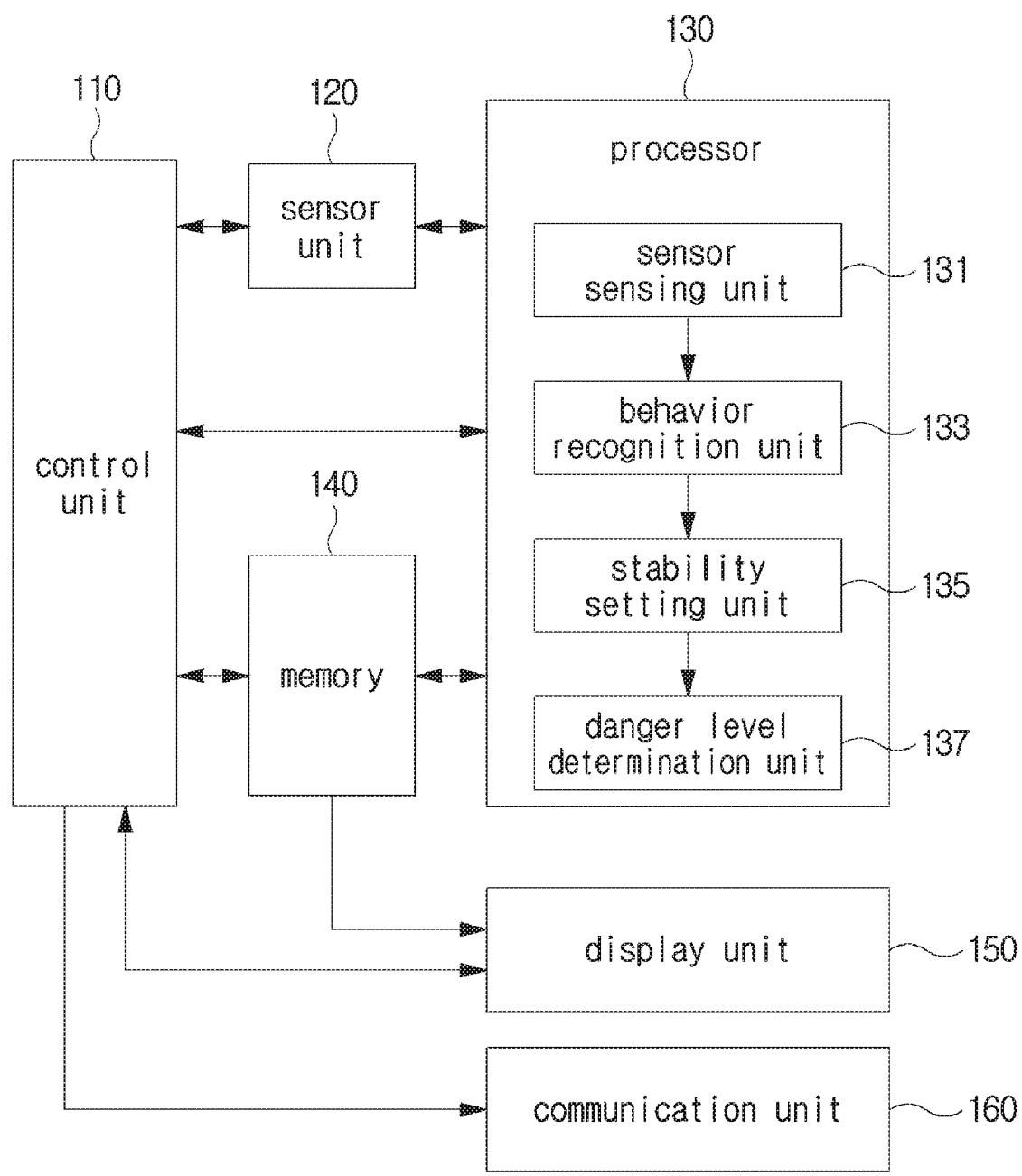

[FIG.2]
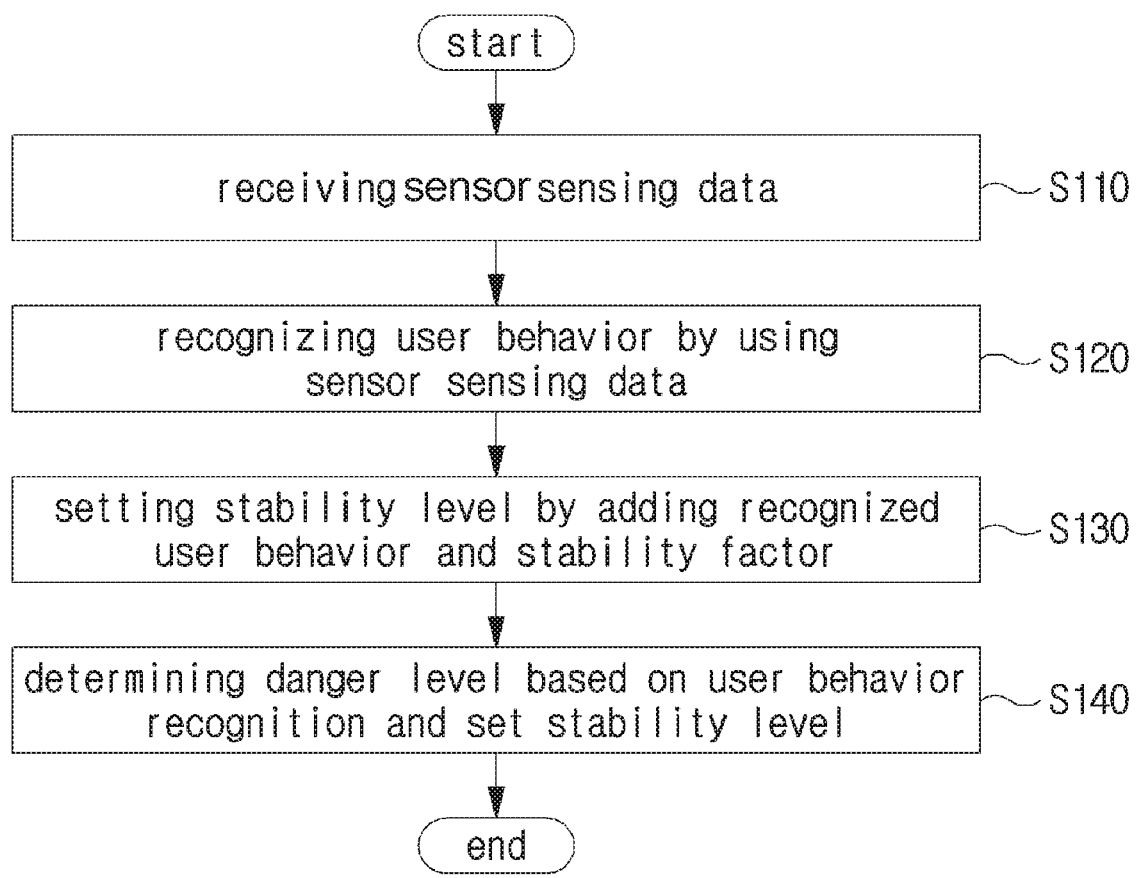

[FIG. 3]
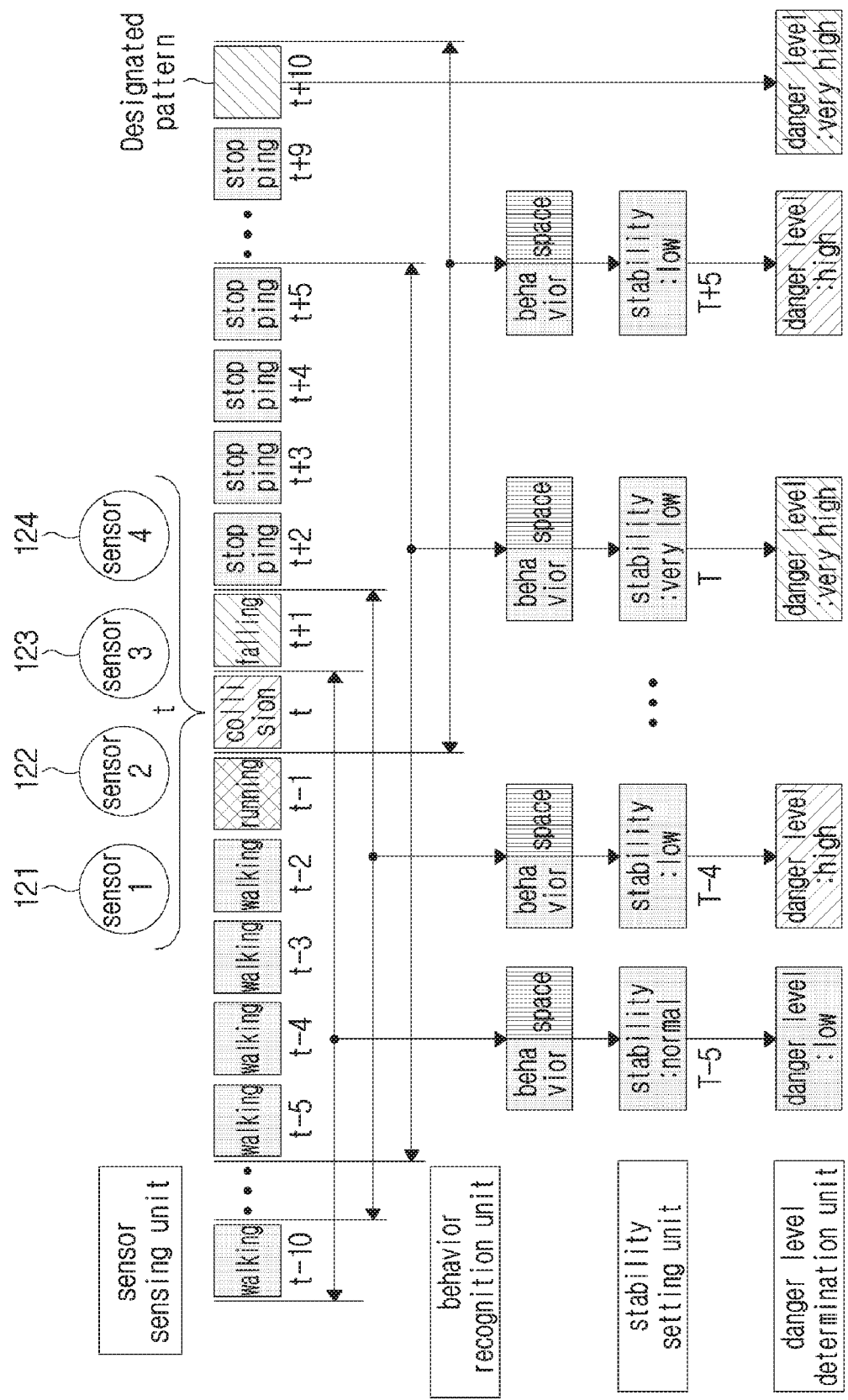

[FIG.4]

| stability factor | ~200 |
|---|---|
| behavior dangerousness | ~2001 |
| behavior change rate | ~2002 |
| behavior periodicity | ~2003 |
| space dangerousness | ~2004 |

[FIG.5]

| situation | t-5 | t-4 | t-3 | t-2 | t-1 | t | t+1 | t+2 | t+3 | t+4 | t+5 | space | user behavior determination |
|---|---|---|---|---|---|---|---|---|---|---|---|---|---|
| 1 | walking | walking | walking | walking | walking | collision | running | walking | walking | walking | walking | outdoors | collision with other person while walking |
| 2 | stopping | stopping | stopping | stopping | stopping | falling | stopping | stopping | stopping | stopping | stopping | home | dropping smart phone during use |
| 3 | stopping | walking | stopping | walking | falling | falling | stopping | stopping | stopping | stopping | stopping | near construction site | fainting while moving |
| 4 | running | running | stopping | running | stopping | collision | falling | collision | stopping | stopping | stopping | crime occurrence area | exposed to crime |
| 5 | stopping | running | stopping | running | running | collision | collision | collision | collision | stopping | stopping | inside of vehicle | accident occurs while driving |

[FIG. 6]
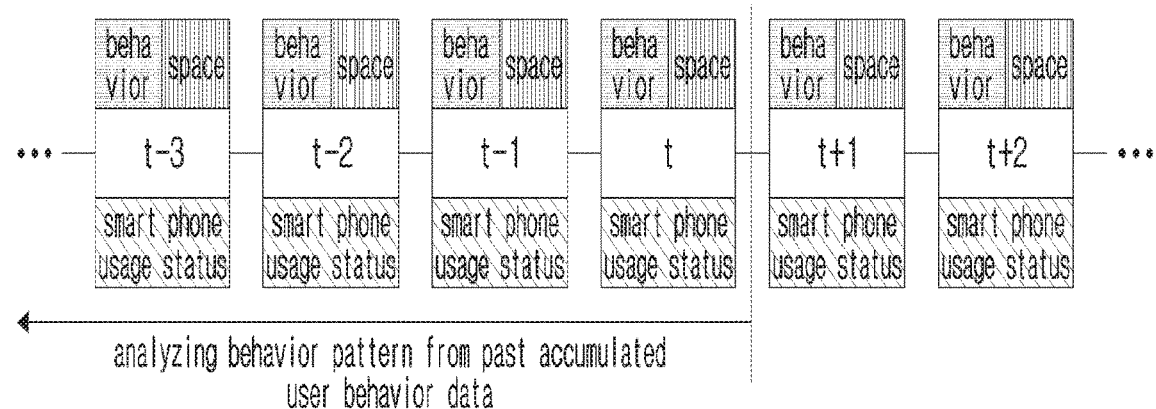
[FIG. 7]
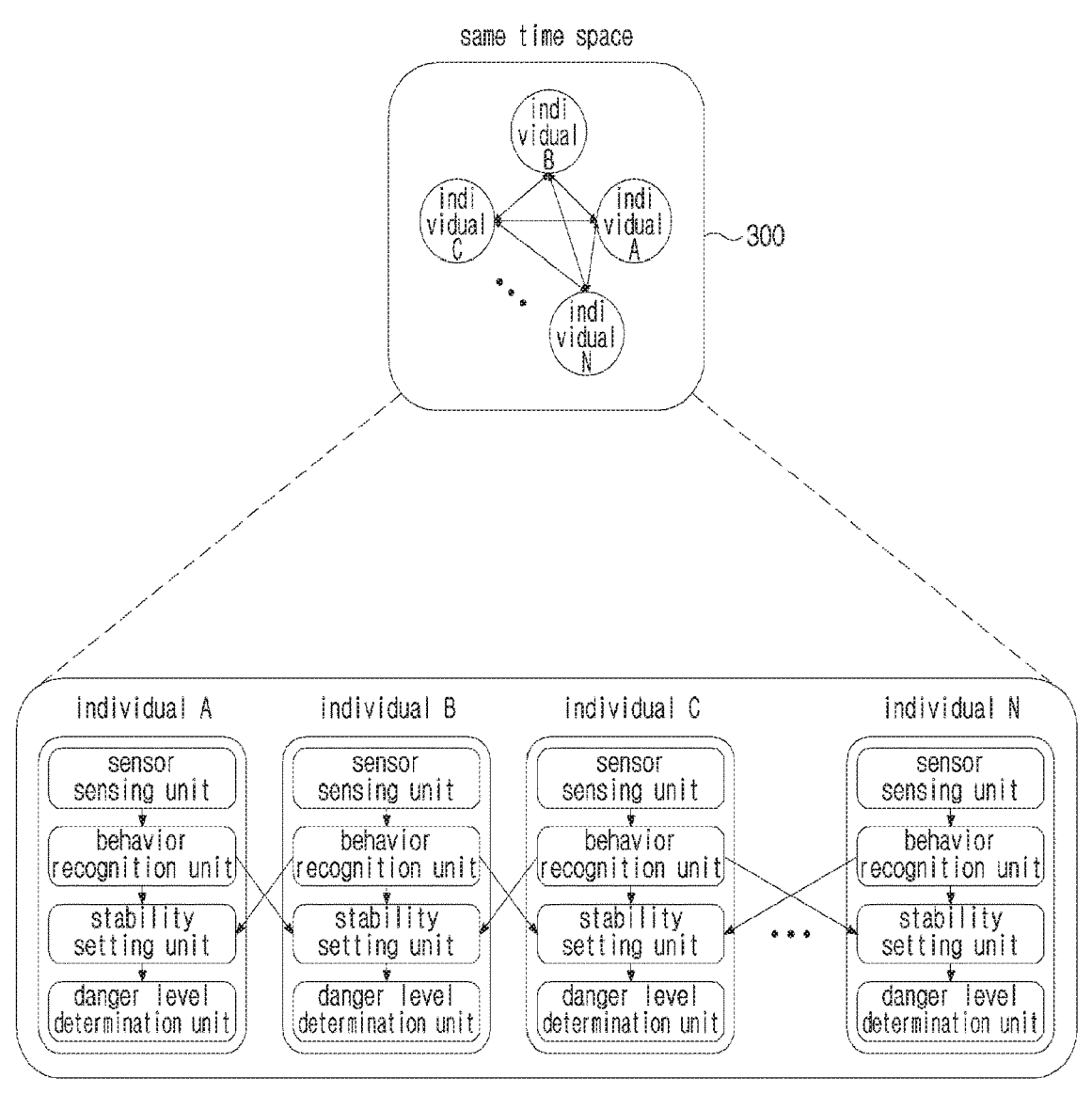

[FIG.8]
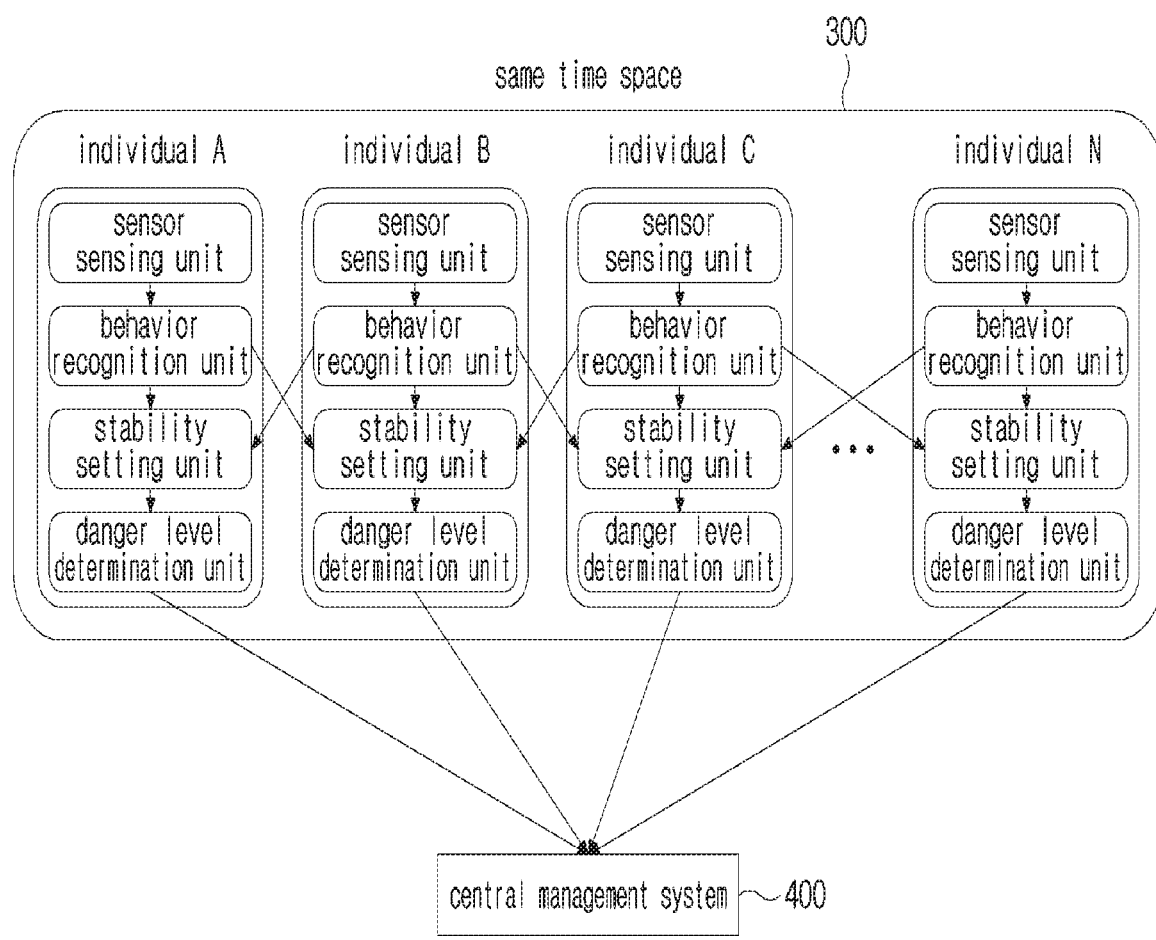

DANGEROUS SITUATION DETECTION METHOD AND APPARATUS USING TIME SERIES ANALYSIS OF USER BEHAVIORS

The present application claims priority to Korean Patent Application No. 10-2018-0044845, filed Apr. 18, 2018, the entire contents of which is incorporated herein for all purposes by this reference.

BACKGROUND OF THE INVENTION

Field of the Invention

The present invention relates generally to dangerous situation detection method and apparatus. More particularly, the present invention relates to dangerous situation detection method and apparatus using a time series analysis of user behaviors based on data collected from various kinds of sensors.

Description of the Related Art

As technology develops, a penetration rate of user mobile devices such as smart phones has increased exponentially every year. For reference, the word wide penetration rate of smart phones reached 58 percent in 2017, and the penetration rate of the smart phone in Korea surpassed 75 percent in 2017. Mobile devices are equipped with various functions to support various applications. In general, various kinds of sensors are also built in the mobile devices. Examples of the types of sensors built in the mobile device include a gyroscope sensor, an acceleration sensor, an illuminance sensor, and the like. Therefore, technologies applying data collected through IoT technology and sensors in mobile devices are being variously studied. Particularly, research has been actively conducted to analyze the huge amount of data detected by built-in sensors of a mobile device using a machine learning technology to recognize a user's behavior.

Accordingly, there is a need to realize method and apparatus for accurately and quickly detecting dangerous situations of a user by using a built-in sensor of the customized mobile device, big data collected by IoT technology, and machine learning, and thus to build a disaster response system that enables many users to quickly overcome dangerous situations.

SUMMARY OF THE INVENTION

Accordingly, the present invention has been made keeping in mind the above problems occurring in the related art, and an object of the present invention is to provide dangerous situation detection method and apparatus using a time series analysis of user behaviors.

Further, another object of the present invention is to provide a mobile device sharing behavior recognition data among a plurality of mobile devices that exist in the same time space and has a dangerous situation detection processor and analyzing behaviors of group users in the same time space, thereby determining a dangerous situation.

It is another object of the present invention to provide a dangerous situation detection system that receives dangerous situation determination data from a plurality of mobile devices existing in the same time and space and detects whether a danger or a disaster has occurred in the corresponding space.

Other objects and advantages of the present invention will be apparent from the following description and more clearly understood by the embodiments of the present invention. It will also be readily apparent that the objects and advantages of the invention may be realized by means and combinations thereof pointed out in the appended claims.

In order to obtain the above objects, a dangerous situation detection method using a time series analysis of user behaviors includes recognizing user behaviors in a time series manner using sensor sensing data, setting stability interval periods and reflecting stability factors on the user behaviors recognized in the time series manner for each of the stability interval periods to set a stability level, and determining a danger level on the basis of the recognized user behaviors and the set stability level.

In addition, the stability factor may include a space dangerousness that determines whether a dangerous accident has occurred in a space where a user exists.

In addition, the stability factors may include at least one of a behavior dangerousness which identifies whether or not the recognized behavior itself is a dangerous behavior such as falling or collision, a behavior change rate which reflects how much a past behavior has changed to a current behavior and is estimated to change to a future behavior, and a behavior periodicity which confirms whether the behavior is repeated periodically.

In addition, the set stability interval periods may be set as time units of any samples.

In addition, the set stability interval periods may be set as time units of 11 samples.

In addition, the method may further include determining the danger level regardless of the stability level by setting a specific behavior pattern that is recognized in the time series manner as a designated pattern.

In addition, the method may further include utilizing an accumulated individual behavior pattern data to determine the danger level.

A dangerous situation detection apparatus using a time series analysis of user behaviors according to the present invention includes a behavior recognition unit recognizing user behaviors in a time series manner using sensor sensing data, a stability setting unit setting stability interval periods and reflecting a stability factor on the user behaviors recognized in the time series manner for each of the stability interval periods to set a stability level, and a danger level determination unit determining a danger level on the basis of the recognized user behaviors and the set stability level.

In addition, the dangerous situation detection apparatus may further include a sensor unit sensing at least the user behaviors; and a sensor sensing unit receiving the sensor sensing data generated by the sensor unit.

In addition, the dangerous situation detection apparatus may further include a communication unit transmitting user behavior data recognized by the behavior recognition unit and/or danger level determination data determined by the danger level determination unit to the outside.

In addition, the dangerous situation detection apparatus may further include a display unit visually transmitting user behavior data recognized by the behavior recognition unit and/or danger level determination data determined by the danger level determination unit.

In addition, the stability factor may include a space dangerousness that determines whether or not a dangerous accident has occurred in a space in which a user exists.

In addition, the stability factor may include at least one of a behavior dangerousness which identifies whether or not the recognized behavior itself is a dangerous behavior such as falling or collision, a behavior change rate which reflects how much a past behavior has changed to a current behavior and is estimated to change to a future behavior, and a behavior periodicity which confirms whether the behavior is repeated periodically.

In addition, the set stability interval periods may be set as time units of any samples. The set stability interval periods may be set as time units of 11 samples.

In addition, the danger level determination unit may determine a danger level regardless of the stability level by setting a specific behavior pattern recognized in the time series manner as a designated pattern.

In addition, the danger level determination unit may utilize an accumulated individual behavior pattern data to determine the danger level.

In addition, a mobile device having a dangerous situation detection processor according to the present invention includes a sensor unit sensing user behaviors and a dangerous situation detection processor recognizing user behaviors in a time series manner using sensor sensing data, setting stability interval periods and reflecting a stability factor on the user behaviors recognized in the time series manner for each of the stability interval periods to set a stability level, and determining a danger level on the basis of the recognized user behaviors and the set stability level, in which behavior recognition data of another mobile device is further utilized to determine the danger level by receiving the behavior recognition data from another mobile device in the same time space.

In addition, a dangerous situation detection system according to the present invention includes a plurality of mobile devices that are present in a same time space and a central management system receiving danger level determination data from the mobile devices to detect a dangerous situation in the same time space, in which each of the mobile devices has a sensor unit sensing user behaviors and a dangerous situation detection processor recognizing user behaviors in a time series manner using sensor sensing data, setting stability interval periods and reflecting stability factors on the user behaviors recognized in the time series manner for each stability interval period to set a stability level, and determining a danger level on the basis of the recognized user behaviors and the set stability level.

According to embodiments of the present invention, the following effects can be obtained. First, it is possible to improve the reliability of dangerous situation determination by analyzing the change of user behaviors in a time series manner. Second, it is possible to determine the dangerous situation by using the sensor data as much as possible even in a situation where it is difficult to obtain image data. In addition, it is possible to compensate exceptions that are not detected by the sensor by using a user designated pattern. Third, it is possible to determine the dangerous situation more closely by analyzing individual behavior pattern accumulation data and the relationship of group behaviors, and it is also possible to introduce the dangerous situation information into the disaster and safety system, thereby promptly coping with the dangerous situation.

BRIEF DESCRIPTION OF THE DRAWINGS

The above and other objects, features and other advantages of the present invention will be more clearly understood from the following detailed description when taken in conjunction with the accompanying drawings, in which:

FIG. 1 illustrates a user mobile device having a dangerous situation detection processor according to the present invention;

FIG. 2 is a flowchart illustrating a dangerous situation detection method using a time series analysis of user behavior according to the present invention;

FIG. 3 is a diagram illustrating a dangerous situation detection method according to the present invention;

FIGS. 4 to 5 are tables proposed as examples to illustrate a primary dangerous situation detection method according to the present invention;

FIG. 6 is a view illustrating an advanced dangerous situation detection method according to the present invention; and FIGS. 7 to 8 illustrate a collective dangerous situation detection system utilizing method and apparatus for detecting a dangerous situation according to another embodiment of the present invention.

DETAILED DESCRIPTION OF THE INVENTION

Hereinbelow, embodiments of the present invention will be described in detail so that those skilled in the art can easily carry out the present invention referring to the accompanying drawings. However, the present disclosure may be embodied in many different forms and is not limited to the embodiments described herein.

In the following description of the embodiments of the present invention, a detailed description of known functions and configurations incorporated herein will be omitted when it may make the subject matter of the present disclosure unclear. Parts not related to the description of the present disclosure in the drawings are omitted, and similar parts are denoted by similar reference numerals.

In the present disclosure, components that are distinguished from one another are intended to clearly illustrate each feature and do not necessarily mean that components are separate. That is, a plurality of components may be integrated into one hardware or software unit, or a single component may be distributed into a plurality of hardware or software units. Accordingly, such integrated or distributed embodiments are also included within the scope of the present disclosure, unless otherwise noted.

In the present disclosure, the components described in the various embodiments do not necessarily mean essential components, but some may be optional components. Accordingly, embodiments consisting of a subset of the components described in an embodiment are also included within the scope of this disclosure. Also, embodiments that include other components in addition to the components described in the various embodiments are also included in the scope of the present disclosure.

Hereinafter, embodiments of the present disclosure will be described with reference to the accompanying drawings.

FIG. 1 illustrates a user mobile device having a dangerous situation detection processor according to the present invention. The user mobile device according to the present invention analyzes user behaviors and user surroundings (e.g., spatial information) to recognize whether or not a user is in a dangerous situation and provides the results to the user himself or to other users and/or a central management system within a public safety agency (e.g., a disaster management headquarters, a fire station, a police station, etc.), thereby recognizing a dangerous situation or a disaster situation.

Referring to FIG. 1, a user mobile device according to the present invention includes a sensor unit 120 for sensing user surroundings and/or user behaviors, a danger detection processor 130 for determining whether there is a dangerous situation or not, a memory 140 for temporarily storing and managing data, a display unit 150 for transmitting a dangerous situation to a user using a visual screen, and a control unit 110 for controlling an operation of each component. In addition, the user mobile device further includes a communication unit 160 capable of communicating with other users and/or the central management system in a wired or wireless manner.

Herein, the danger detection processor 130 is configured to include a sensor sensing unit 131 for sensing a user's behavior, a behavior recognition unit 133 for recognizing a user's behavior based on information obtained from the sensor, a stability setting unit 135 for setting a stability based on the user's behavior, and a danger level determination unit 137 for determining a dangerous situation of the user on the basis of the stability.

The sensor sensing unit 131 receives a sensing signal sensed by the mobile device. In particular, the sensor sensing unit 131 collects data from the sensor unit 120, which is housed in a portable device such as a smart phone or a wearable device. The type of the sensor unit 120 may be a gyroscope sensor, an acceleration sensor, an illuminance sensor, a GPS, or the like. A sensor such as a GPS and an illuminance sensor may be used for sensing the space to acquire information on a space where the event occurs.

The behavior recognition unit 133 analyzes the data collected from the sensor sensing unit 131 and classifies the current state of the user, for example, into states such as walking, stopping, running, falling, collision, a user designated pattern, and the like according to time. The sensor data may also reflect various situations such as sitting, lying down, exercising, moving in vehicle, etc. in addition to stopping and running. Herein, a machine learning technique may be applied to the data analysis.

The stability setting unit 135 analyzes spatial information and the user behavior recognized by the behavior recognition unit 133 according to the period in order to set the stability level. That is, the stability setting unit 135 does not directly determine whether or not the user is in a dangerous situation based on only the user's actions recognized by the behavior recognition unit 133, but determines the stability level by further analyzing the information on a space where the user is located.

The danger level determination unit 137 finally determines the danger level of the user surroundings on the basis of the recognized user behavior and the stability level set by the stability setting unit 135.

Hereinafter, with reference to FIGS. 2 to 5, a dangerous situation detection method using a time series analysis of user behavior according to the present invention will be described in detail.

FIG. 2 is a flowchart illustrating dangerous situation detection method using a time series analysis of user behaviors according to the present invention. In this regard, FIG. 3 is a diagram illustrating a primary dangerous situation detection method according to the present invention, and FIGS. 4 to 5 are tables proposed as examples to illustrate the primary dangerous situation detection method according to the present invention.

Referring to FIG. 2, a processor recognizing the dangerous situation through the time series analysis of the user behaviors according to the present invention receives sensor sensing data of the user surroundings using the mobile device (S110). For example, the sensor sensing data is generated through behavior sensing performed by the sensor unit 120 in the mobile device in response to user behaviors (e.g., walking, running, stopping, collision, falling, etc.). For example, FIG. 3 shows a result of detecting data sensed at every time (t) through four sensors 121, 122, 123, and 124.

The user behavior is recognized using the received sensor sensing data (S120). That is, as described above, it is possible to recognize user behaviors (e.g., walking, running, stopping, collision, falling, etc.) of a user who possesses a mobile device. For example, FIG. 3 shows a result of recognizing user behavior from data sensed at every time (t) through four sensors 121, 122, 123, and 124. Specifically, in a time series manner, for example, the user behavior is recognized as 'walking' from the previous time t−10 to the time t−2, with respect to a reference time t; as 'running in the time t−1; as 'collision" in the reference time t; as 'falling' in the time t+1; and thereafter as 'stopping' from the time t+2 to the time t+9.

Thereafter, the stability level is set by adding a stability factor to the user behavior that is recognized in the time series manner (S130). For example, in FIG. 3, the stability level setting is determined by setting each of 11 values (e.g., t−10 to t, t−5 to t+5, etc.) of the behavior recognition unit as one interval input (i.e., stability interval period). For example, an interval from time 't−10 to t' is set as a stability interval (T−5), an interval from t−9 to t+1 is set as a stability interval (T−4), and an interval from t to t+10 is set as a stability interval (T+5). However, the number of input values may be arbitrarily changed, and the present invention is not limited thereto.

The stability level may be set by referring to the stability factor for each of the stability intervals. The stability level may be set to be classified into 'good', 'normal', 'low', or 'very low', for example, but the present invention is not limited thereto.

FIG. 4 shows a list of stability factors that may be considered in the stability determination in the step S130 and the stability setting unit 135, for example. For example, the stability factors 200 include a behavior dangerousness 2001 which identifies whether or not the recognized behavior itself is a dangerous behavior such as falling or collision, a behavior change rate 2002 which reflects how much the past behavior has changed to the current behavior and is estimated to change to the future behavior, and a behavior periodicity 2003 which confirms whether the behavior is repeated periodically. In addition, using the data on the spatial information, it is possible to reflect a space dangerousness 2004 which determines whether or not a dangerous event occurs in the space in which the user exists.

In this regard, FIG. 3 illustrates an example considering the space dangerousness 2004 among the stability factors 200. However, as noted above, it is clear that the other stability factors 200, i.e., the behavior dangerousness 2001, the behavior change rate 2002, and the behavior periodicity 2003 may be applied in the same way.

In other words, the example of FIG. 3 exemplifies a situation in which the walking state is maintained in the 'outdoors' of the surrounding space, the collision and falling occur, and then the stopping state is rendered. In this case, since the state of a user has changed from walking to stopping, the collision and falling may be determined to be a great danger to the user. When, for example, the user has undergone collision and falling while walking outdoors, but resumes walking again, the collision and falling may not be determined to be a great danger to the user. This is because the user is not falling while waking outdoors, but is likely to have dropped or shaken his/her smart phone. That is, the greater the state changes before and after the falling and collision is detected, the lower the stability level will be set, when the falling or collision is detected within the stability interval period. A machine learning technique may be applied to such a stability level setting algorithm.

Therefore, according to the example of FIG. 3, according to the stability level setting algorithm, the interval (T−5) is provided such that the 'running behavior is recognized in 'outdoors' so that the stability level is set to 'normal', the interval (T−4) is provided such that 'collision' behavior is recognized in the 'outdoors' so that the stability level is set to 'very low', the interval (T) is provided such that 'falling' and 'stopping' behaviors are recognized after 'collision' in the 'outdoors' so that the stability level is set to 'very low', and the interval (T+5) is provided such that the 'stopping' behavior continued to be recognized in the 'outdoor' after 'collision' in the 'outdoors' so that the stability level is set to 'low'.

After the step S130, the danger level is determined based on the user behavior recognition and the set stability level (S140). The danger level determination unit 137 described above determines the danger level of the current situation of the user on the basis of the stability level set by the stability setting unit 135.

When the user 'designated pattern' is recognized in the behavior recognition unit 133, the danger level may be determined to be very high without separately determining the stability level. For example, the user behavior may be recognized as the 'designated pattern' at the time 't+10' in FIG. 3. In this regard, the 'designated pattern' refers to a type of behavior that is specified separately in addition to walking, running, falling, and collision, regardless of continuous behaviors of the user. When the 'designated pattern' is detected, the danger level of the current situation may be determined to be 'very high' irrespective of the stability level. For example, when a user designates, as the 'designated pattern', a case where a user shakes a smart phone while hiding the illuminance sensor of the smart phone and does the corresponding behavior, even behaviors of a stable pattern such as 'walking'→'walking'→'designated pattern'→'walking' are determined to be a danger level 'very high'. That is, as the user may arbitrarily set a specific action pattern as the 'designated pattern' in preparation for a situation in which detection by the sensor is impossible, a dangerous situation may be informed. In particular, the setting of the designated pattern may be useful when a user may not carry a portable device in a dangerous situation. However, contrary to the above example, it is also possible to set a 'designated pattern' in which a specific continuous user behavior is determined to be a danger level 'low'.

In this regard, FIG. 5 illustrates various example situations in which the user behavior may be estimated in consideration of the behavior recognition and the surrounding space. For example, a situation 1 indicates that walking 'outdoors' is maintained, and walking is maintained even after the collision is recognized. This may reflect a situation in which the user hits the object lightly while walking. In this case, among the stability factors above described referring to FIG. 4, the behavior dangerousness 2001 is determined to be somewhat higher because the collision itself is a behavior followed by danger. On the other hand, the behavior change rate 2002 may be measured to be low so that the stability is determined to be higher. In other words, when observing behaviors before and after the behavior of 'collision' in 11 time samples, 'walking' behavior appears and the behavior does not change greatly so that the behavior change rate 2002 was measured to be low. When the 'walking' behavior continues to be repeated in the next cycle, the behavior periodicity 2003 will be measured highly. This means the behavior maintains a consistent pattern, whereby the stability may be set high. Therefore, upon comprehensively reflecting the above situation, the danger level may be determined to be low.

In addition, for example, a situation 2 corresponds to a case where a behavior of 'falling' is recognized but 'stopping' is maintained before and after the falling. This is determined to be a behavior change capable of occurring when the user drops a smart phone during use and resumes use thereof after picking it up, so that the stability is set high.

In addition, for example, a situation 3 is a behavior change capable of occurring when a user who has been moving slowly experiences a sudden accident. In this case, when the place where the dangerous situation has occurred is near the 'construction site', it may be estimated that the accident has occurred due to the collision with a falling object at the construction site.

For example, a situation 4 and a situation 5 are cases in which a tendency of behaviors is likely to be similar, in which it is not easy to determine whether the user is exposed to a crime or an accident occurs while the user is driving, only on the basis of the user behavior recognition. However, when the surrounding space is analyzed in addition to the behavior recognition, it may be determined that there is a high likelihood that the user has been exposed to the crime because the situation 4 has the 'crime occurrence area' as the behavior space, and there is a high likelihood that there is a traffic accident because the user has the 'inside of the vehicle' as the behavior space.

Therefore, it may be seen from the situations 1 to 5 of FIG. 5 that not only the user behavior recognition but also the space in which the behavior has occurred may be used as the main stability determination and danger determination factor.

FIG. 6 is a view for explaining an advanced dangerous situation detection method according to the present invention. As one of the embodiments of the present invention, the primary dangerous situation detection method of FIG. 3 is performed by collecting user behavior and spatial information by the time period and analyzing a user behavior pattern from the collected information.

On the other hand, another embodiment of the present invention according to FIG. 6 is characterized by accumulating and utilizing a user behavior pattern in addition to the primary system of FIG. 3. Specifically, in order to more closely analyze the user behavior pattern, the embodiment is provided such that information on the mobile device (e.g., smart phone) usage status is added, and the past user behavior pattern is accumulated through the information on smart phone usage status and reflected to determine the current situation.

For example, when a user shows a new abnormal pattern that is different from the usual behavior pattern, a likelihood of a dangerous situation is increased. On the other hand, when a pattern that was previously a dangerous situation is identified to be actually not a dangerous situation, a likelihood of a dangerous situation is reduced. For example, when a situation occurs for the first time in which a user behavior repeats 'collision', 'falling', and 'running', it may be determined as a dangerous situation. However, when this tendency of behavior pattern has occurred in the past, and a user was exercising as a result of checking the actual situation at that time, it may be assumed that the current behavior is also due to the exercising.

FIGS. 7 and 8 illustrate a collective dangerous situation detection system utilizing the dangerous situation detection method and apparatus, according to another embodiment of the present invention.

FIGS. 7 and 8 are characterized in that behavior relationship of group users is utilized in the dangerous situation detection system. Specifically, referring to FIG. 7, when a plurality of individual users exists in the same space time, each having the primary danger detection processors (i.e., the sensor detection unit, the behavior recognition unit, the stability setting unit, and the danger determination unit) of FIGS. 1 and 2 described above, the stability setting unit of each individual reflects the behavior of the other users. In addition, the determination result of the danger determination unit of each individual in the same space time 300 may be collected and utilized to recognize the collective dangerous situation of the space 300.

For example, referring to FIG. 7, each individual user A, B, C, . . . , N exists in the same space time 300 and is involved with each other in setting stability. That is, all individual users are involved with each other in setting stability, such as not only between A and B and between B and C, but also between C and N, between A and N, and between B and B. Therefore, according to the above structure, it is possible to greatly enhance the reliability of the danger determination of the whole group as well as the danger level determination of each individual.

For example, suppose an accident occurred while driving a 'bus'. When only individual behavior is analyzed, it may be difficult to precisely discriminate whether the individual drops a smart phone or an accident actually has occurred. However, when there appears to be a common behavior of 'collision' by analyzing the behaviors of all individuals or most individuals who share a space of 'bus', and the behavior of 'collision' is set as a factor lowering the stability at the time of setting the stability of each individual, it is highly likely to be determined as a dangerous situation. In other words, it is possible to recognize a collective dangerous situation because it is determined that the accident has occurred in the bus where they boarded.

FIG. 8 shows a still other embodiment, in which the behavior of each individual does not affect setting the stability of the other individuals, the individual danger determination data is converged on the public control agency (for example, the disaster management headquarters, the fire department, the police station, etc.) and processed to be analyzed in an overall manner, and the behavior relationship between the individuals is analyzed, so that the dangerousness of each individual is checked again or the collective dangerous situation in the time space 300 is recognized earlier.

Specifically, FIGS. 7 and 8 are different in that the embodiment of FIG. 7 is a method of determining the danger level by distributing the behavior recognition data of each individual, while the embodiment of FIG. 8 is a method of determining the danger degree by being concentrated on the behavior recognition data of each individual.

Although the exemplary methods of this disclosure are represented by a series of steps for clarity of explanation, they are not intended to limit the order in which the steps are performed, and if necessary, each step may be performed simultaneously or in a different order. In order to implement the method according to the present disclosure, it is possible to include other steps to the illustrative steps additionally, exclude some steps and include remaining steps, or exclude some steps and include additional steps.

The various embodiments of the disclosure are not intended to be exhaustive of all possible combination, but rather to illustrate representative aspects of the disclosure, and the features described in the various embodiments may be applied independently or in a combination of two or more.

In addition, various embodiments of the present disclosure may be implemented by hardware, firmware, software, or a combination thereof. In the case of hardware implementation, it may be implemented by one or more application specific integrated circuits (ASICs), digital signal processors (DSPs), digital signal processing devices (DSPDs), programmable logic devices (PLDs), field programmable gate arrays (FPGAs), a general processor, a controller, a microcontroller, a microprocessor, and the like.

The scope of the present disclosure includes software or machine-executable instructions (e.g., operating system, applications, firmware, program) that allow operations according to the various embodiments to be executable in device or computer, and a non-transitory computer-readable medium that is executable in the device or computer in which such software or instruction are stored.

It will be apparent to those skilled in the art that various modifications and variations can be made in the present invention without departing from the spirit or scope of the invention as defined in the appended claims, so the scope of the present invention are not limited by the embodiments and the accompanying drawings.

The invention claimed is:

1. A dangerous situation detection method using a time series analysis of user behaviors, the method comprising:
   recognizing user behaviors in a time series manner using sensor sensing data;
   setting stability interval periods and reflecting a stability factor on the user behaviors recognized in the time series manner for each of the stability interval periods to set a stability level; and
   determining a danger level on the basis of the recognized user behaviors and the set stability level.

2. The method of claim 1, wherein the stability factor includes a space dangerousness that determines whether a dangerous accident has occurred in a space where a user exists.

3. The method of claim 1, wherein the stability factor includes at least one of a behavior dangerousness which identifies whether or not the recognized behavior itself is a dangerous behavior such as falling or collision, a behavior change rate which reflects how much a past behavior has changed to a current behavior and is estimated to change to a future behavior, and a behavior periodicity which confirms whether the behavior is repeated periodically.

4. The method of claim 1, wherein the set stability interval periods are set as time units of any samples.

5. The method of claim 1, wherein the set stability interval periods are set as time units of 11 samples.

6. The method of claim 1, further comprising:
   determining the danger level regardless of the stability level by setting a specific behavior pattern that is recognized in the time series manner as a designated pattern.

7. The method of claim 1, further comprising:
   utilizing an accumulated individual behavior pattern data to determine the danger level.

8. A dangerous situation detection apparatus using a time series analysis of user behaviors, the apparatus comprising:
   a sensor sensing at least user behaviors;
   a sensor sensing unit receiving sensor sensing data generated by the sensor unit;
   a behavior recognition unit recognizing the user behaviors in a time series manner using the sensor sensing data;

a stability setting unit setting stability interval periods and reflecting a stability factor on the user behaviors recognized in the time series manner for each of the stability interval periods to set a stability level; and a danger level determination unit determining a danger level on the basis of the recognized user behaviors and the set stability level.

9. The apparatus of claim 8, further comprising:
a communication unit transmitting user behavior data recognized by the behavior recognition unit and/or danger level determination data determined by the danger level determination unit to the outside.

10. The apparatus of claim 8, further comprising:
a display unit visually transmitting user behavior data recognized by the behavior recognition unit and/or danger level determination data determined by the danger level determination unit.

11. The apparatus of claim 8, wherein the stability factor includes a space dangerousness that determines whether or not a dangerous accident has occurred in a space in which a user exists.

12. The apparatus of claim 8, wherein the stability factor includes at least one of a behavior dangerousness which identifies whether or not the recognized behavior itself is a dangerous behavior such as falling or collision, a behavior change rate which reflects how much a past behavior has changed to a current behavior and is estimated to change to a future behavior, and a behavior periodicity which confirms whether the behavior is repeated periodically.

13. The apparatus of claim 8, wherein the set stability interval periods are set as time units of any samples.

14. The apparatus of claim 8, wherein the set stability interval periods are set as time units of 11 samples.

15. The apparatus of claim 8, wherein the danger level determination unit determines a danger level regardless of the stability level by setting a specific behavior pattern recognized in the time series manner as a designated pattern.

16. The apparatus of claim 8, wherein the danger level determination unit utilizes an accumulated individual behavior pattern data to determine the danger level.

17. A dangerous situation detection system, comprising:
a plurality of mobile devices that are present in a same time space, the mobile devices each having a sensor unit sensing user behaviors and a dangerous situation detection processor recognizing user behaviors in a time series manner using sensor sensing data, setting stability interval periods and reflecting a stability factor on the user behaviors recognized in the time series manner for each of the stability interval period to set a stability level, and determining a danger level on the basis of the recognized user behaviors and the set stability level; and a central management device receiving danger level determination data from the mobile devices to detect a dangerous situation in the same time space.

* * * * *